United States Patent
Miwa

(10) Patent No.: US 8,969,279 B2
(45) Date of Patent: Mar. 3, 2015

(54) SOLVENT SYSTEMS HAVING NO FLASH POINT AND METHODS USING SUCH SOLVENT SYSTEMS FOR DISSOLVING RIGID POLYURETHANE FOAMS

(75) Inventor: Hisashi Miwa, Setagaya-ku (JP)

(73) Assignee: Albemarle Corporation, Baton Rouge, LA (US)

( * ) Notice: Subject to any disclaimer, the term of this patent is extended or adjusted under 35 U.S.C. 154(b) by 347 days.

(21) Appl. No.: 13/497,856

(22) PCT Filed: Oct. 6, 2010

(86) PCT No.: PCT/US2010/051643
§ 371 (c)(1),
(2), (4) Date: Mar. 23, 2012

(87) PCT Pub. No.: WO2011/044245
PCT Pub. Date: Apr. 14, 2011

(65) Prior Publication Data
US 2012/0184477 A1    Jul. 19, 2012

Related U.S. Application Data

(60) Provisional application No. 61/249,859, filed on Oct. 8, 2009.

(51) Int. Cl.
| | | |
|---|---|---|
| C11D 7/50 | (2006.01) | |
| C08J 3/09 | (2006.01) | |
| C08G 85/00 | (2006.01) | |
| C08J 11/08 | (2006.01) | |
| C11D 11/00 | (2006.01) | |

(52) U.S. Cl.
CPC ............ *C08J 3/091* (2013.01); *C08G 85/008* (2013.01); *C08J 11/08* (2013.01); *C11D 7/5018* (2013.01); *C11D 7/5068* (2013.01); *C11D 11/0041* (2013.01); *C08J 2375/04* (2013.01)
USPC ........... 510/273; 510/412; 134/22.19; 134/40

(58) Field of Classification Search
CPC ..................................................... C11D 7/5018
USPC .......................... 510/273, 412; 134/22.19, 40
See application file for complete search history.

(56) References Cited

U.S. PATENT DOCUMENTS

| | | | |
|---|---|---|---|
| 6,306,943 B1 * | 10/2001 | Henry | 524/270 |
| 6,689,734 B2 * | 2/2004 | Doyel et al. | 510/410 |
| 2003/0083220 A1 | 5/2003 | Doyel et al. | |
| 2005/0233924 A1 * | 10/2005 | Kaneko | 510/177 |
| 2010/0298479 A1 * | 11/2010 | Barry | 524/427 |

FOREIGN PATENT DOCUMENTS

| | | |
|---|---|---|
| JP | 2008-007690 | 1/2008 |
| WO | WO 02/28992 | 4/2002 |
| WO | WO 2008/137277 | 11/2008 |

\* cited by examiner

*Primary Examiner* — Gregory Webb
(74) *Attorney, Agent, or Firm* — Marcy M. Hoefling; James A. Jubinsky; Nathan C. Dunn

(57) ABSTRACT

This invention relates to solvent systems useful for foam nozzle cleaning, which solvent systems are formed by combining at least a brominated compound, an alcohol and a stabilizer in amounts such that the solvent system has no flash point.

11 Claims, No Drawings

SOLVENT SYSTEMS HAVING NO FLASH POINT AND METHODS USING SUCH SOLVENT SYSTEMS FOR DISSOLVING RIGID POLYURETHANE FOAMS

BACKGROUND

Industrial processes for producing polyurethane foam, especially rigid polyurethane foam, include injecting polyols and multi functional isocyanates with curing and blowing agents by using a twin injection nozzle. This nozzle and the inside of the nozzle pipe are cleaned immediately after each operation to prevent clogging by cross-linked polyurethane onto the nozzle and pipe surface. Chlorinated solvents or hydrocarbon solvents are commonly used in this cleaning. However during their use, gel solutions are formed due to cross linking reactions between the polyols and multi functional isocyanates in solution. Such gel solutions can not be recycled for reuse.

It is well known that alcohols, especially primary alcohols, are useful to prevent gel formation in such solvents. In rigid polyurethane foam applications, the (—OH) portion of the alcohols easily reacts with excess isocyanates (—NCO) and, thus, prevents the cross-linking reaction from occurring. However most formulation comprising such alcohols have low flash points and thus are undesirable for use in factory settings.

Cleaning solvents categorized as non-DG (no flash point) that can remove rigid polyurethane foam on injection nozzles without gel formation in the solution are commercially available. Methylene chloride is commonly used in such solvents, but used solvent must be disposed of.

Therefore, a need exists for solvent systems suitable for removing rigid polyurethane foam from processing equipment, which solvent systems provide good solvency and non-gel byproducts, are suitable for recycle/reuse, and are otherwise suitable for industrial use.

THE INVENTION

This invention satisfies the above-defined needs by providing solvent systems produced, or having been produced, by combining at least: (a) from about 20 wt % to about 90 wt % of a brominated compound, (b) from about 10 wt % to about 80 wt % of an alcohol comprising a primary alcohol or a secondary alcohol, and (c) from about 0.05 wt % to about 6.0 wt % of a stabilizer, wherein the amounts of the brominated compound, the alcohol, and the stabilizer are selected so that the solvent system has no flash point. Also provided are processes for removing rigid polyurethane foam from surfaces and/or articles, wherein such processes comprise (i) contacting the polyurethane foam with a solvent system produced, or having been produced, by combining: (a) from about 20 wt % to about 90 wt % of a brominated compound, (b) from about 10 wt % to about 80 wt % of an alcohol comprising a primary alcohol or a secondary alcohol, and (c) from about 0.05 wt % to about 6.0 wt % of a stabilizer, wherein the amounts of the brominated compound, the alcohol, and the stabilizer are selected so that the solvent system has no flash point; and (ii) thereby producing used solvent, wherein there is essentially no gel formation in the used solvent. In processes of this invention, used solvent can evaporate away from the surface or article.

Surprisingly, we have found that solvent systems of this invention produced by combining at least the brominated compound, the stabilizer, and the alcohol in amounts up to about 80 wt %, based on the total weight of the solvent system, not only provide high solvency against polyurethane with no gel formation in solution, but also have no flash point.

Brominated Compound

Brominated compounds suitable for use in this invention can comprise, without limitation, brominated hydrocarbons having from 2 to 14 carbon atoms, or from 3 to 10 carbon atoms, or from 3 to 8 carbon atoms. Non-limiting examples of brominated hydrocarbons suitable for use in solvent systems of this invention include 1,2-dibromoethane, 1,2-dibromoethylene, n-propyl bromide (a.k.a. 1-bromopropane), 1,2-dibromopropane, 1,3-dibromopropane, 1,2-dibromobutane, 1,3-dibromobutane, 1,2-dibromohexane, 1,6-dibromohexane, 1-bromododecane, and 1-bromotetradecane. The brominated compound can comprise 2 or more of such suitable brominated compounds. In this specification, all ranges include any ranges encompassed therein.

From about 20 wt % to about 90 wt %, or about 20 to about 89.05 wt %, of the brominated compound can be used in producing solvent systems of this invention, based on the total weight of the solvent system. When n-propyl bromide is used in producing solvent systems of this invention, the n-propyl bromide used can be a least about 98% pure. A particularly suitable n-propyl bromide is 99+ wt % n-propyl bromide. n-Propyl bromide can be supplied commercially from Albemarle Corporation, Baton Rouge, La.

Alcohol

Alcohols suitable for use in this invention can comprise, without limitation, primary alcohols such as methanol, ethanol, 1-propanol, 1-butanol, isobutanol, 1-pentanol, 1-hexanol, and secondary alcohols such as 2-butanol, 2-propanol, 2-hexanol, and isopropyl alcohol. The alcohol can comprise 2 or more of such suitable alcohols.

From about 10 wt % to about 80 wt %, or about 10 wt % to about 79.05 wt %, of an alcohol comprising a primary alcohol or a secondary alcohol can be used in producing solvent systems of this invention, based on the total weight of the solvent system. For example, the alcohol can comprise 15 wt % or 20 wt % or 25 wt % or 30 wt % of 1-propanol.

Stabilizer

Stabilizers suitable for use in this invention can comprise, without limitation, epoxides and nitroalkanes. For certain application, as will be known to those skilled in the art, the stabilizer can comprise ethers.

Non-limiting examples of suitable epoxides include 1,2-epoxybutane, epichlorohydrin, propylene oxide, butylene oxide, cyclohexene oxide, glycidyl methyl ether, glycidyl methacrylate, pentene oxide, cyclopentene oxide and cyclohexene oxide. They are usable either singularly or in the form of a mixture of two or more of them.

Non-limiting examples of nitroalkanes usable in the present invention include nitromethane, nitroethane, 1-nitropropane, 2-nitropropane and nitrobenzene. They are usable either singularly or in the form of a mixture of two or more of them.

Non-limiting examples of suitable ethers include 1,2-dimethoxyethane, 1,4-dioxane, 1,3-dioxolane, diethyl ether, diisopropyl ether, dibutyl ether, trioxane, alkyl cellosolves in which the alkyl group has 1 to 10 carbon atoms such as methyl cellosolve, ethyl cellosolve and isopropyl cellosolve, dimethyl acetal, butyrolactone, methyl t-butyl ether, tetrahydrofuran and N-methylpyrrole. They are usable either singularly or in the form of a mixture of two or more of them.

From about 0.05 wt % to about 6.0 wt % of a stabilizer can be used in producing solvent systems of this invention, based on the total weight of the solvent system. In compositions of this invention, the stabilizer can comprise from about 0.05 wt % to about 3.0 wt % of an epoxide and/or from about 0.05 wt % to about 3.0 wt % of a nitroalkane. For example, the stabilizer can comprise 0.1 wt % or 0.25 wt % or 0.5 wt % 0.75 wt % or 1 wt % or 2 wt % of 1,2-epoxybutane and/or 0.1 wt % or 0.25 wt % or 0.5 wt % or 0.75 wt % or 1 wt % or 2 wt % of nitroethane and/or nitromethane.

This invention is advantageous as it provides cleaning solvents that can remove even rigid polyurethane foam from injection nozzles without gel formation in the solution and with good solvency, and that have no flash point as measured according to Standard Test Method for Flash Point by Tag Closed Cup Tester (TCC) (ASTM D56-05; JIS K 2265-1), despite the presence of alcohol.

This invention provides, for example, solvent systems categorized as non-DG (no flash point) comprising n-propyl bromide and either a 1-propanol or 2-butanol. Such solvent systems are useful in dissolving polyurethane foam remaining on equipment such as an injection nozzle, injection pipes and tank, and are also useful in cleaning operations such as cold cleaning and vapor degreasing.

EXAMPLES

The following examples are illustrative of the principles of this invention. It is understood that this invention is not limited to any one specific embodiment exemplified herein, whether in the examples or the remainder of this patent application.

Example 1

Several solvent systems according to this invention were tested. The results are given in Table 1.

TABLE 1

| Flash Point test results by TCC | |
|---|---|
| 1-propanol content (wt %) in stabilized n-propyl bromide | Flash Point degrees C. |
| 30 | No flash detected |
| 40 | No flash detected |
| 50 | No flash detected |
| 80 | No flash detected |

All samples were tested from 0 deg C. to 70 deg C. (boiling point)

It can be seen from the results reported in Table 1, that in solvent systems of this invention having up to 80 wt % of 1-propanol content in stabilized n-propyl bromide mixtures do not have a flash point.

Example 2

Rigid Polyurethane Dissolution

Dissolution tests were conducted under the conditions indicated. Also, gel formation was monitored in each solution after 30 days. Data is shown in Table 2.
Solvent systems:
Series A: Stabilized n-propyl bromide (80 wt %) and 1-propanol (20 wt %)
Series B: Stabilized n-propyl bromide (70 wt %) and 1-propanol (30 wt %)
Series C: Stabilized n-propyl bromide (60 wt %) and 1-propanol (40 wt %)
Substrate (formed polyurethane by injection of known monomers) content:
Series $A_1$, $B_1$, $C_1$: 10 wt %
Series A2, $B_2$, $C_2$: 20 wt %
Series $A_3$, $B_3$, $C_3$: 30 wt %

TABLE 2

| | Experiment No. | | | | | | | | |
|---|---|---|---|---|---|---|---|---|---|
| | $A_1$ | $A_2$ | $A_3$ | $B_1$ | $B_2$ | $B_3$ | $C_1$ | $C_2$ | $C_3$ |
| Status | H | H | H | H | H | H | H | H | H |
| 1-propanol content after 30 days (wt %) | 8.3 | 7.5 | 6.2 | 11.4 | 11.9 | 10.5 | 14.7 | 12.9 | 12.1 |
| Gel formation after 30 days | X | X | X | X | X | X | X | X | X |

H: homogeneous system

It is to be understood that the reactants and components referred to by chemical name or formula anywhere in the specification or claims hereof, whether referred to in the singular or plural, are identified as they exist prior to being combined with or coming into contact with another substance referred to by chemical name or chemical type (e.g., another reactant, solvent, or etc.). It matters not what chemical changes, transformations and/or reactions, if any, take place in the resulting mixture or solution or reaction medium as such changes, transformations and/or reactions are the natural result of bringing the specified reactants and/or components together under the conditions called for pursuant to this disclosure. Thus the reactants and components are identified as ingredients to be brought together in connection with performing a desired chemical reaction or in forming a mixture to be used in conducting a desired reaction. Accordingly, even though the claims hereinafter may refer to substances, components and/or ingredients in the present tense ("comprises", "is", etc.), the reference is to the substance, component or ingredient as it existed at the time just before it was first contacted, combined, blended or mixed with one or more other substances, components and/or ingredients in accordance with the present disclosure, Whatever transformations, if any, which occur in situ as a reaction is conducted is what the claim is intended to cover. Thus the fact that a substance, component or ingredient may have lost its original identity through a chemical reaction or transformation during the course of contacting, combining, blending or mixing operations, if conducted in accordance with this disclosure and with the application of common sense and the ordinary skill of a chemist, is thus wholly immaterial for an accurate understanding and appreciation of the true meaning and substance of this disclosure and the claims thereof.

While the present invention has been described in terms of one or more preferred embodiments, it is to be understood that other modifications may be made without departing from the scope of the invention, which is set forth in the claims below.

What is claimed is:

1. A solvent system produced by combining components consisting essentially of: (a) from about 20 wt % to about 90 wt % of a brominated compound, (b) from about 10 wt % to about 80 wt % of an alcohol consisting of a primary alcohol and/or a secondary alcohol, and (c) from about 0.05 wt % to about 6.0 wt % of a stabilizer consisting essentially of an epoxide, a nitroalkane, and/or an ether, wherein the amounts of the brominated compound, the alcohol, and the stabilizer are selected so that the solvent system has no flash point and when used for removing polyurethane foam from a surface produces a used solvent having essentially no gel formation.

2. The solvent system of claim 1 wherein the brominated compound is n-propyl bromide.

3. The solvent system of claim 1 wherein the alcohol comprises methanol, ethanol, 1-propanol, 1-butanol, 1-pentanol, 2-propanol and/or 2-butanol.

4. The solvent system of claim 1 wherein the nitroalkane is nitromethane and/or nitroethane, and the epoxide is 1,2-epoxybutane.

5. A solvent system produced by combining components consisting essentially of: (a) from about 20 wt % to about 90 wt % of n-propyl bromide, (b) from about 10 wt % to about 80 wt % of 1-propanol and/or 2-butanol, and (c) from about 0.05 wt % to about 6.0 wt % of a stabilizer consisting essentially of (i) 1,2-epoxybutane and/or (ii) nitromethane and/or nitroethane, wherein the amounts of the n-propyl bromide, the 1-propanol and/or 2-butanol, and the stabilizer are selected so that the solvent system has no flash point and when used for removing polyurethane foam from a surface produces a used solvent having essentially no gel formation.

6. A process for cleaning polyurethane foam from an article, said process consisting essentially of:
(i) contacting the polyurethane foam with a solvent system produced by combining components consisting essentially of: (a) from about 20 wt % to about 90 wt % of a brominated compound, (b) from about 10 wt % to about 80 wt % of an alcohol consisting of a primary alcohol and/or a secondary alcohol, and (c) from about 0.05 wt % to about 6.0 wt % of a stabilizer consisting essentially of an epoxide, a nitroalkane, and/or an ether, wherein the amounts of the brominated compound, the alcohol, and the stabilizer are selected so that the solvent system has no flash point and when used for removing the polyurethane foam from the article produces a used solvent having essentially no gel formation; and
(ii) thereby producing the used solvent, wherein there is essentially no gel formation in the used solvent.

7. The process of claim 6 wherein the brominated compound comprises is n-propyl bromide.

8. The process of claim 6 wherein the alcohol comprises methanol, ethanol, 1-propanol, 1-butanol, 1-pentanol, 2-propanol and/or 2-butanol.

9. The process of claim 6 wherein the nitroalkane is nitromethane and/or nitroethane, and the epoxide is 1,2-epoxybutane.

10. The process of claim 6 wherein the article is a nozzle or a pipe being used in a polyurethane foaming process.

11. A process for cleaning polyurethane foam from an article, said process consisting essentially of:
(i) contacting the polyurethane foam with a solvent system produced by combining components consisting essentially of: (a) from about 20 wt % to about 90 wt % of n-propyl bromide, (b) from about 10 wt % to about 80 wt % of an alcohol consisting essentially of 1-propanol and/or 2-butanol, and (c) from about 0.05 wt % to about 6.0 wt % of a stabilizer consisting essentially of (i) 1,2-epoxybutane and (ii) nitromethane and/or nitroethane, wherein the solvent system has no flash point and when used for removing the polyurethane foam from the article produces a used solvent having essentially no gel formation; and
(ii) thereby producing the used solvent, wherein there is essentially no gel formation in the used solvent.

* * * * *